(12) United States Patent
Hao et al.

(10) Patent No.: US 8,999,462 B2
(45) Date of Patent: Apr. 7, 2015

(54) PHOTOSENSITIVE MONOMER AND LIQUID CRYSTAL PANEL

(71) Applicants: Sikun Hao, Guangdong (CN); Chung-Ching Hsieh, Guangdong (CN); Chung Yi Chiu, Guangdong (CN)

(72) Inventors: Sikun Hao, Guangdong (CN); Chung-Ching Hsieh, Guangdong (CN); Chung Yi Chiu, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 106 days.

(21) Appl. No.: 13/703,942

(22) PCT Filed: Nov. 15, 2012

(86) PCT No.: PCT/CN2012/084663
§ 371 (c)(1),
(2) Date: Dec. 13, 2012

(87) PCT Pub. No.: WO2014/075261
PCT Pub. Date: May 22, 2014

(65) Prior Publication Data
US 2014/0132900 A1    May 15, 2014

(30) Foreign Application Priority Data
Nov. 14, 2012 (CN) .......................... 2012 1 0455746

(51) Int. Cl.
C09K 19/00 (2006.01)
G02F 1/1337 (2006.01)
C09K 19/04 (2006.01)
C09K 19/12 (2006.01)

(52) U.S. Cl.
CPC .... G02F 1/13378 (2013.01); C09K 2019/0448 (2013.01); C09K 2019/122 (2013.01); G02F 1/133788 (2013.01); G02F 2001/133742 (2013.01); G02F 2001/133746 (2013.01)

(58) Field of Classification Search
CPC . G02F 1/1335; G02F 1/1337; G02F 1/13378; G02F 1/133711; G02F 2001/133742; G02F 1/133788; G02F 1/133746; G09K 19/3833; G09K 19/3852; G09K 2019/0448; G09K 2019/122
USPC .............. 428/1.1, 1.2; 349/96, 123, 127, 130, 349/183, 191; 560/194, 221
See application file for complete search history.

(56) References Cited

U.S. PATENT DOCUMENTS

| 2009/0141215 A1 | 6/2009 | Bremer et al. |
| 2012/0224124 A1 | 9/2012 | Goetz et al. |

(Continued)

FOREIGN PATENT DOCUMENTS

| CN | 101329479 A | 12/2008 |
| CN | 101445455 A | 6/2009 |
| CN | 102597166 A | 7/2012 |

(Continued)

Primary Examiner — Gwendolyn Blackwell
Assistant Examiner — Ruiyun Zhang
(74) Attorney, Agent, or Firm — Kirton McConkie; Evan R. Witt

(57) ABSTRACT

The present invention provides a photosensitive monomer of which hydrogen atoms of benzene ring of a hard core are substituted by fluorine atoms to increase the electronegativity of the hard core, so that the curing voltage of the curing process is reduced. The photosensitive monomer of the present invention not only reduces the curing voltage and curing time of the curing process of liquid crystal panels, but also increases the pretilt angle of liquid crystal molecules to reduce the response time of a liquid crystal display, so that image sticking and MURA phenomenon are reduced.

7 Claims, 1 Drawing Sheet

(56) References Cited

U.S. PATENT DOCUMENTS

2013/0021568 A1 1/2013 Hsieh et al.
2013/0321755 A1 12/2013 Hsieh
2014/0022473 A1 1/2014 Goetz et al.

FOREIGN PATENT DOCUMENTS

| | | |
|---|---|---|
| CN | 102604648 A | 7/2012 |
| CN | 102732264 A | 10/2012 |
| EP | 2484743 A2 | 8/2012 |

PHOTOSENSITIVE MONOMER AND LIQUID CRYSTAL PANEL

FIELD OF THE INVENTION

The present invention relates to a photosensitive monomer and a liquid crystal panel having the photosensitive monomer, especially relates to a photosensitive monomer introduced fluorine atom and a liquid crystal panel having the photosensitive monomer.

BACKGROUND OF THE INVENTION

Liquid crystal display (LCD) is a flat panel display device using the characteristics of the liquid crystal materials to display images which has many advantages, such as light-weight, low driving voltage and low power consumption, and has becoming the mainstream products in the whole consumer market.

Liquid crystal panel is the most important component of the LCD which contains a thin film transistor (TFT) array substrate and a color filter (CF) substrate that are laminated in vacuum, a liquid-crystal layer and alignment films filled between them. The alignment films are equipped on the TFT array substrate and/or CF substrate to control the predetermined initial arrangement of liquid crystal molecules of the liquid-crystal layer in order to influence the performance of the liquid crystal panel.

Polymer stabilized vertical alignment (PSVA) technology has becoming the mainstream because of the features of high penetration rate, high contrast and fast response. In the conventional PSVA technology, liquid crystal reactive monomer (RM) is doped in to liquid crystal, after applying voltage, a pretilt angle of the liquid crystal molecules is produced and the RM is linked to polyimide (PI) of alignment films, and lastly, after UV exposure, polymerizable monomers come into polymer and the pretilt angle of the liquid crystal molecules is fixed.

But, there are problems in conventional PSVA technology, such as limited choices of liquid crystal molecule, poor compatibility of liquid crystal molecule and RM, transportation and storage problems, etc.

Surface controlled vertical alignment (SCVA) technology is developed to solve the problems of PSVA technology. Compared with PSVA technology, in SCVA technology, RM is doped in alignment materials so that there are more choices of crystal molecule, and SCVA technology does not suffer compatibility issue of liquid crystal molecule and RM, transportation issue and storage issue; meanwhile, SCVA technology also has advantages including less impurities, high reliability, etc. However, the voltage (30V) applied on substrates in SCVA technology is higher than the voltage (10V) applied on substrates in PSVA technology, and the pretilt angle of liquid crystal molecules (less than 1°) is so small that the response time of the display is too long.

As a result, it is necessary to provide the improvement of the existing technology to solve the problems existing in the conventional technologies.

SUMMARY OF THE INVENTION

The first object of the present invention is to provide a photosensitive monomer of which hydrogen atoms of benzene ring of a hard core are substituted by fluorine atoms to increase the electronegativity of the hard core, so that the photosensitive monomer can form a larger pretilt angle under a lower curing voltage to reduce the response time of the display.

To achieve the above object, the present invention provides a photosensitive monomer doped into alignment films of a liquid crystal panel, which is represented by the following formula (I):

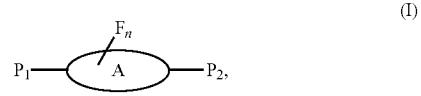

(I)

wherein group A is a hard core, the hard core is a biphenyl group of which at least one hydrogen atom is substituted by fluorine atom, n is the number of the fluorine atom that substitute the hydrogen atom, and the group A is represented by the following formula (i) or (ii):

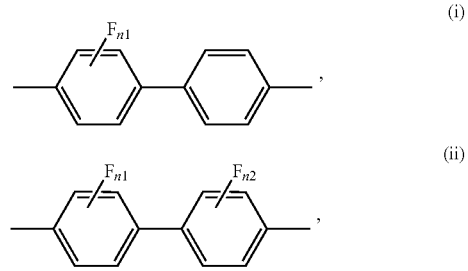

wherein n1 and n2 are the number of the fluorine atom that substitute the hydrogen atom, and n1 and n2 are independently greater than or equal to 1;

group P1 is represented by the following formula (iii):

(iii)

wherein group R is alkyl group comprising 1~12 carbon atoms, wherein one or two nonadjacent $CH_2$— group can be substituted by —O—, —CH=CH—, —CO—, —OCO— or —COO— so that oxygen atoms are bonded directly to each other; and group $P_2$ is represented by the following formula (iv):

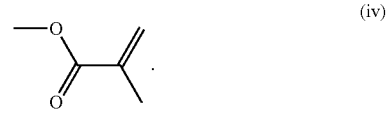

(iv)

In one embodiment of the present invention, the photosensitive monomer is represented by the following formula (II)~(VIII):

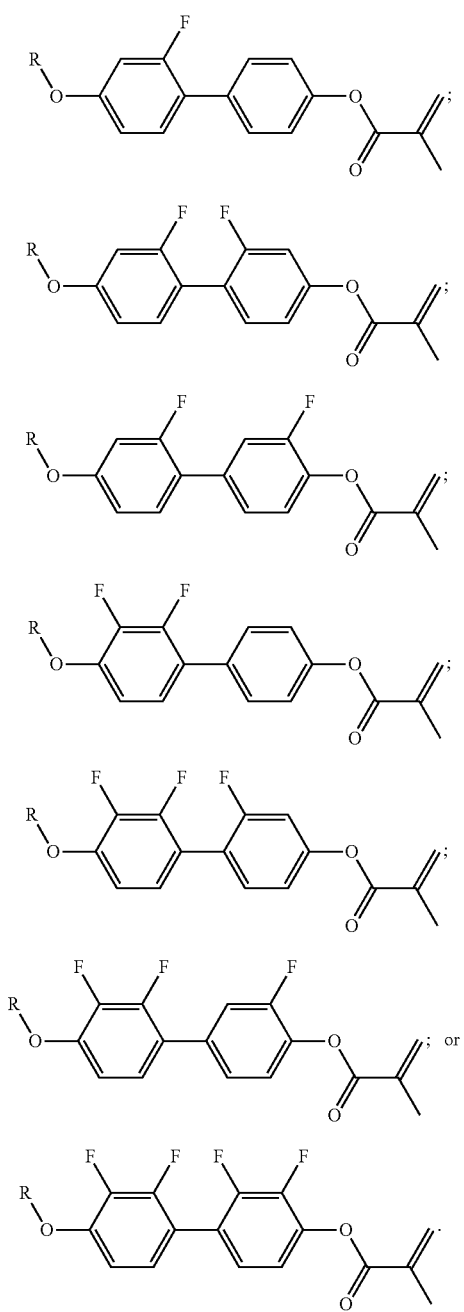

In one embodiment of the present invention, the alignment film of the liquid crystal panel is a surface controlled vertical alignment type (SC-VA) alignment film.

The second object of the present invention is to provide a liquid crystal panel comprising a first substrate, a second substrate and liquid crystal materials filled between the first substrate and the second substrate, wherein the first substrate is equipped with a first transparent electrode layer and a first alignment film in turn;

the second substrate is equipped with a second transparent electrode layer and a second alignment film in turn; and the liquid crystal materials are in contact with the first and second alignment films; wherein the first and second alignment films contain at least one type of photosensitive monomer mentioned above.

In one embodiment of the present invention, the weight ratio of the photosensitive monomer in the first alignment film is in a range from 1% to 20%, preferably is in a range from 1% to 10%, and especially is 10%.

In one embodiment of the present invention, the weight ratio of the photosensitive monomer in the second alignment film is in a range from 1% to 20%, preferably is in a range from 1% to 10%, and especially is 10%.

In one embodiment of the present invention, the liquid crystal composition contains at least one liquid crystal molecule and at least one liquid crystal reactive monomer.

In one embodiment of the present invention, the first substrate is a color filter substrate and the second substrate is a thin film transistor array substrate.

In one embodiment of the present invention, the first and second alignment films are surface controlled vertical alignment type alignment films.

In one embodiment of the present invention, the liquid crystal composition is a liquid crystal composition of one-drop filling technology.

In the present invention, hydrogen atoms of a hard core of the photosensitive monomer are substituted by fluorine atoms to increase the electronegativity of the hard core, so that the curing voltage of the curing process in SCVA technology is reduced. There are two main methods for introducing fluorine atoms into the photosensitive monomer, as follows:

① C—H bond or other functional group is directly converted to C—F bond with fluorinating agents, such as $F_2$, HF, $SF_4$, etc; and ② fluorine atoms are introduced indirectly from raw materials, such as fluorine-containing small molecules, and new C—F bond is not formed during the reaction.

It should be noted that the liquid crystal molecule and the liquid crystal reactive monomer in the present invention are known in the art.

The positive effect of the present invention is that:

(1) the curing voltage and the curing time of the curing process manufacturing liquid crystal panels are reduced; and (2) the pretilt angle of the liquid crystal molecules is increased to reduce the response time of a liquid crystal display, so that image sticking and MURA phenomenon are reduced.

wherein

| | |
|---|---|
| 11-first substrate; | 12-second substrate; |
| 20-liquid crystal composition; | 21-liquid crystal molecules; |
| 31-first transparent electrode layer; | 32-second transparent electrode layer; |
| 41-first alignment film; | 42-second alignment film; and |
| 50-photosensitive monomer. | |

DESCRIPTION OF THE INVENTION

Embodiments, for purposes of explanation, are set forth in order to provide a thorough understanding of the present invention and not to limit the technical solution of the present invention.

According to a preferred embodiment of the present invention, the photosensitive monomer is suitable to be doped into alignment film materials of surface controlled vertical alignment (SCVA) type, and the photosensitive monomer is represented by the following formula (II)~(VIII):

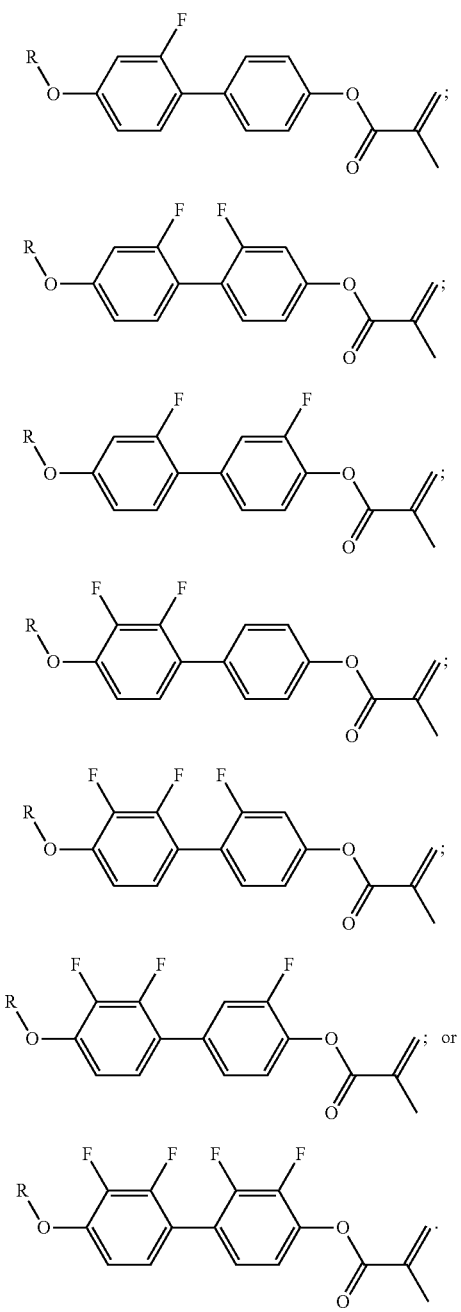

Figure 1:
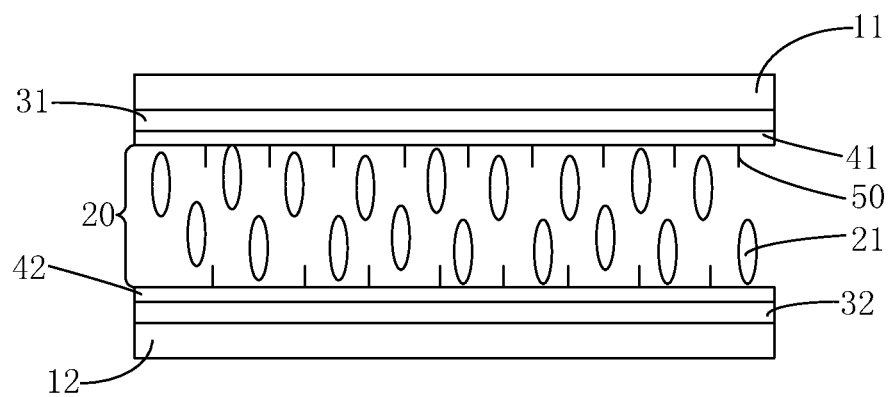
FIG. 1 is a schematic view of a liquid crystal panel and liquid crystal compositions contained therein according to a preferred embodiment of the present invention.

As shown in FIG. 1, according to a preferred embodiment of the present invention, the present invention also provides a liquid crystal panel comprising a first substrate 11, a second substrate 12 and liquid crystal composition 20 filled between the first and the second substrate. The first substrate 11 is a color filter (CF) substrate and the second substrate 12 is a thin film transistor (TFT) array substrate. The liquid crystal composition 20 is a liquid crystal composition of one-drop filling technology, which contains liquid crystal molecules 21.

A first transparent electrode layer 31 and a first alignment film 41 is equipped, in turn, on the first substrate 11, and a second transparent electrode layer 32 and a second alignment film 42 is equipped, in turn, on the second substrate 12. The liquid crystal composition 20 is in contact with the first alignment film 41 and second alignment film 42.

The alignment films contain any type of photosensitive monomer 50 mentioned above. The photosensitive monomer 50 is applied to the first and second alignment films 41, 42 of surface controlled vertical alignment (SCVA) technology, that is, the first and second alignment films 41, 42 contain alignment compositions specially designed for surface controlled vertical alignment technology, polyimide and the photosensitive monomer 50. The weight ratio of the photosensitive monomer 50 in the first alignment film 11 is 10%, and the weight ratio of the photosensitive monomer 50 in the second alignment film is 10%.

Figure 2:
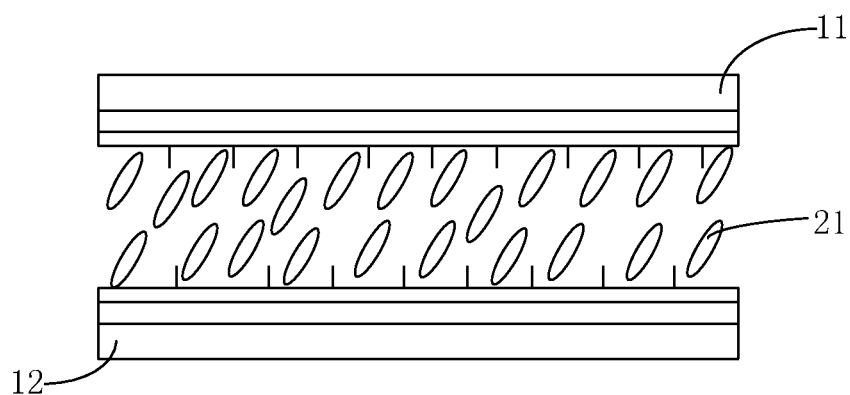
FIG. 2 is a schematic view of liquid crystal compositions after applying voltage on a liquid crystal panel according to a preferred embodiment of the present invention.

Referring now to FIG. 2, pretilt angle of liquid crystal molecules is created by applying voltage on transparent electrode layers of the liquid crystal panel of the present invention and is fixed after UV exposure in which polymer monomers come into polymer.

Referring now to Tab.1, which is comparisons between the traditional SCVA technology (hydrogen atoms of a hard core is not substituted by fluorine atoms) and SCVA technology having the photosensitive monomer of the present invention (at least one hydrogen atom of a hard core is substituted by at least one fluorine atom).

TABLE 1 comparisons between traditional SCVA technology and SCVA technology having the photosensitive monomer of the present invention

| | Response time of a display | Pretilt angle of liquid crystal molecules | Curing voltage | Curing time |
|---|---|---|---|---|
| traditional SCVA technology | longer | smaller | higher | longer |
| SCVA technology having the photosensitive monomer of the present invention | shorter | larger | lower | shorter |

It is clear from Tab.1 that SCVA technology having the photosensitive monomer of the present invention overcomes the defects existing in the traditional SCVA technology.

Hydrogen atoms of a hard core of the photosensitive monomer of present invention are substituted by fluorine atoms to increase the electronegativity of the hard core, so that curing voltage and curing time of the alignment film curing process in SCVA technology are reduced, and pretilt angle of liquid crystal molecules is increased to reduce the response time of a display, so that image sticking and MURA phenomenon are reduced.

The present invention has been described with relative embodiments which are examples of the present invention only. It should be noted that the embodiments disclosed are not the limit of the scope of the present invention. Conversely, modifications to the scope and the spirit of the claims, as well as the equal of the claims, are within the scope of the present invention.

What is claimed is:

1. A photosensitive monomer, doped into an alignment film of a liquid crystal panel, wherein the photosensitive monomer is represented by one of the following formulae (II)~(VIII):

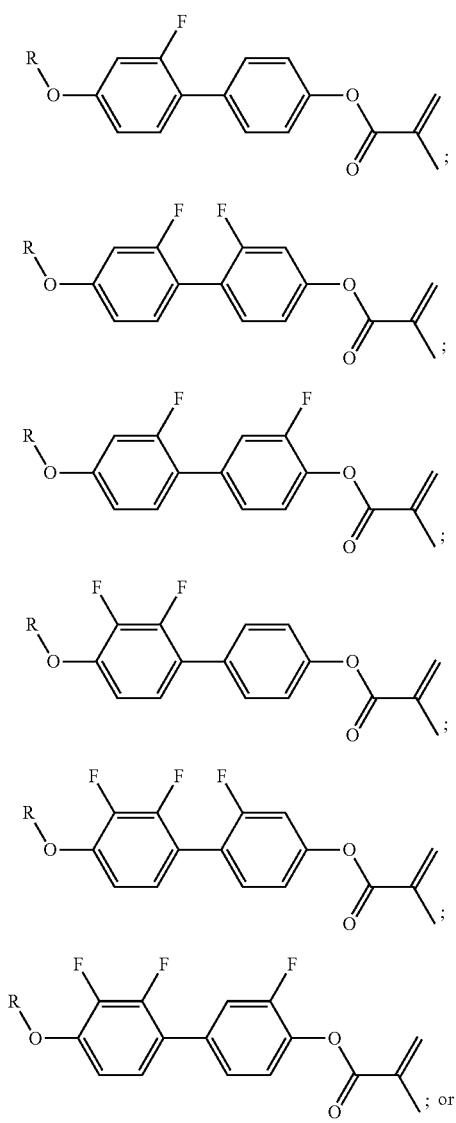

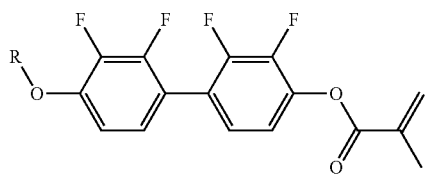

wherein group R is an alkyl group comprising 1~12 carbon atoms, wherein one or two nonadjacent —CH$_2$— groups can be substituted by —O—, —CH=CH—, —CO—, —OCO— or —COO—, so that oxygen atoms are not bonded directly to each other.

2. A liquid crystal panel, comprising a first substrate, a second substrate and liquid crystal materials filled between the first substrate and the second substrate, wherein the first substrate is equipped with a first transparent electrode layer and a first alignment film in turn;

the second substrate is equipped with a second transparent electrode layer and a second alignment film in turn; and the liquid crystal materials are in contact with the first and second alignment films, wherein the first and second alignment films contain at least one type of photosensitive monomer according to claim 1.

3. The liquid crystal panel according to claim 2, wherein the weight ratio of the photosensitive monomer in the first alignment film is in a range from 1% to 20%.

4. The liquid crystal panel according to claim 2, wherein the weight ratio of the photosensitive monomer in the second alignment film is in a range from 1% to 20%.

5. The liquid crystal panel according to claim 2, wherein the first substrate is a color filter substrate, and the second substrate is a thin film transistor array substrate.

6. The liquid crystal panel according to claim 2, wherein the liquid crystal composition is a liquid crystal composition of one-drop filling technology.

7. The liquid crystal panel according to claim 2, wherein the first and second alignment films are surface controlled vertical alignment type alignment films.

* * * * *